(12) United States Patent
Hiedenstierna et al.

(10) Patent No.: US 6,834,247 B2
(45) Date of Patent: Dec. 21, 2004

(54) OFF-SET ELIMINATION SYSTEM FOR A VIBRATING GYROSCOPE

(75) Inventors: Nils Hiedenstierna, Vastra Frolunda (SE); Gert Andersson, Lindome (SE); Per Svensson, Billdal (SE)

(73) Assignee: Autoliv Development AB, Vargarda (SE)

( * ) Notice: Subject to any disclaimer, the term of this patent is extended or adjusted under 35 U.S.C. 154(b) by 217 days.

(21) Appl. No.: 10/187,789

(22) Filed: Jul. 3, 2002

(65) Prior Publication Data

US 2003/0006671 A1 Jan. 9, 2003

(30) Foreign Application Priority Data

Jul. 9, 2001 (GB) ............................................. 0116812

(51) Int. Cl.$^7$ ........................ G01D 18/00; G01D 21/00; G01M 19/00; G01P 21/00; G06R 35/00
(52) U.S. Cl. ......................... 702/85; 702/6; 73/504.02; 73/504.12; 73/504.15; 73/504.16; 73/574.32; 73/152.54; 73/151; 701/220; 701/213; 356/459
(58) Field of Search ........................ 73/504.02, 504.12, 73/574.32, 151; 702/6, 85; 701/220, 213; 356/459

(56) References Cited

U.S. PATENT DOCUMENTS 6,293,148 B1 * 9/2001 Wang et al. .............. 73/504.02
6,453,239 B1 * 9/2002 Shirasaka et al. ........... 701/220

FOREIGN PATENT DOCUMENTS

WO              99/38016 A1      7/1999

* cited by examiner

Primary Examiner—Bryan Bui
Assistant Examiner—Aditya Bhat
(74) Attorney, Agent, or Firm—Venable LLP; Robert Kinberg

(57) ABSTRACT

A gyroscope that may include various sources of error, with those sources of error each being dependent upon a different parameter, is associated with a simulation or "model" of the gyroscope which is typically a computer simulation. The computer simulation is provided with errors which can be adjusted to be identical with the errors present in the real gyroscope. An arrangement is provided to adjust the errors in the model of the gyroscope to be identical with the errors in the real gyroscope, that arrangement including Kalman filters which receive signals generated by subtracting the outputs of the real gyroscope and the model gyroscope, while simultaneously varying the various inputs to the real gyroscope. The Kalman filters also generate a signal which is an estimate of the angular rotation being sensed by the real gyroscope. When the model of the gyroscope is running in perfect synchronism with the real gyroscope, it can be assumed that all of the errors in the real gyroscope are replicated in the model gyroscope, and the estimate of angular rotation being supplied to the model gyroscope is actually equal to the real angular rotation being sensed by the real gyroscope.

20 Claims, 3 Drawing Sheets

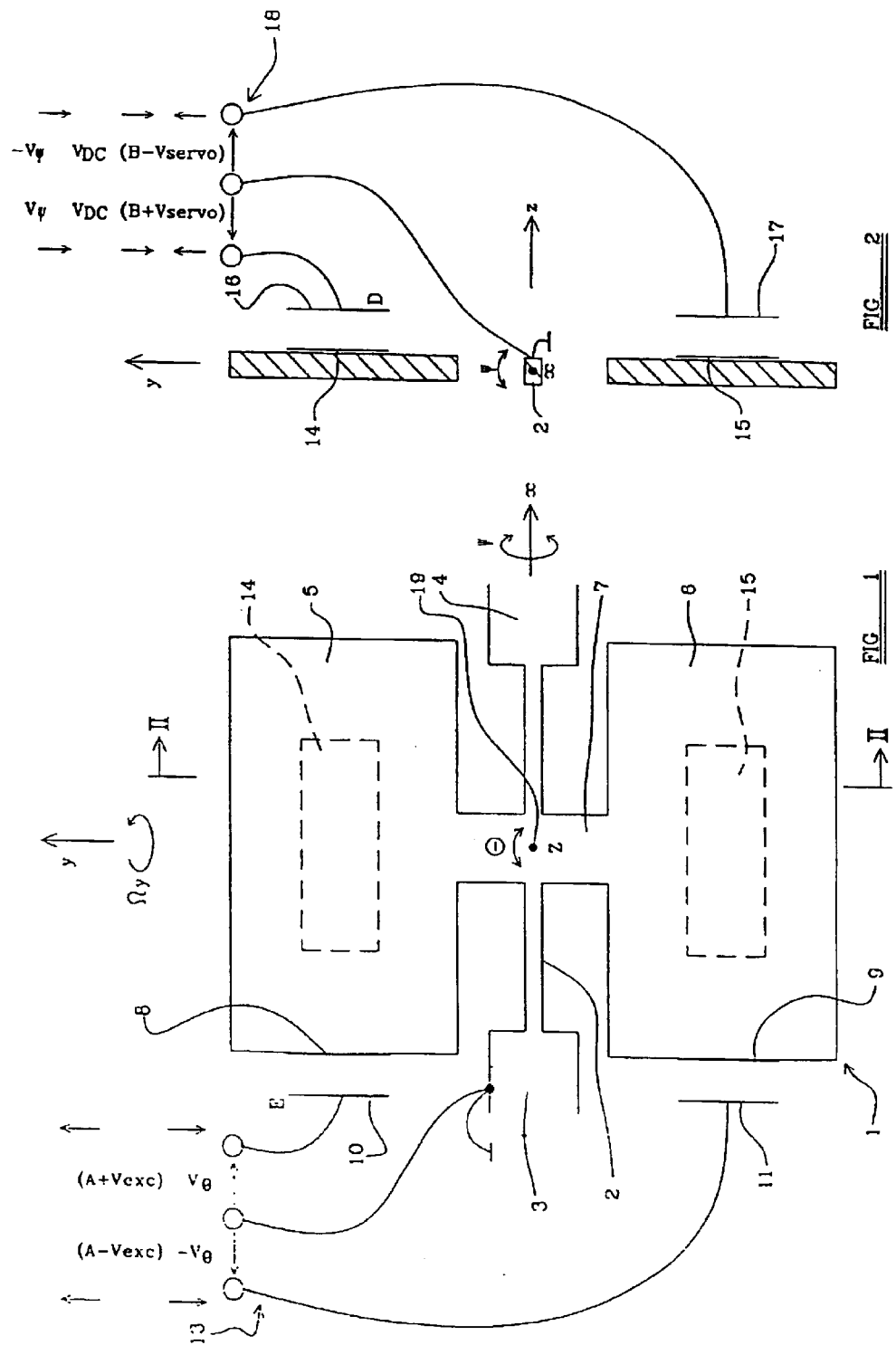

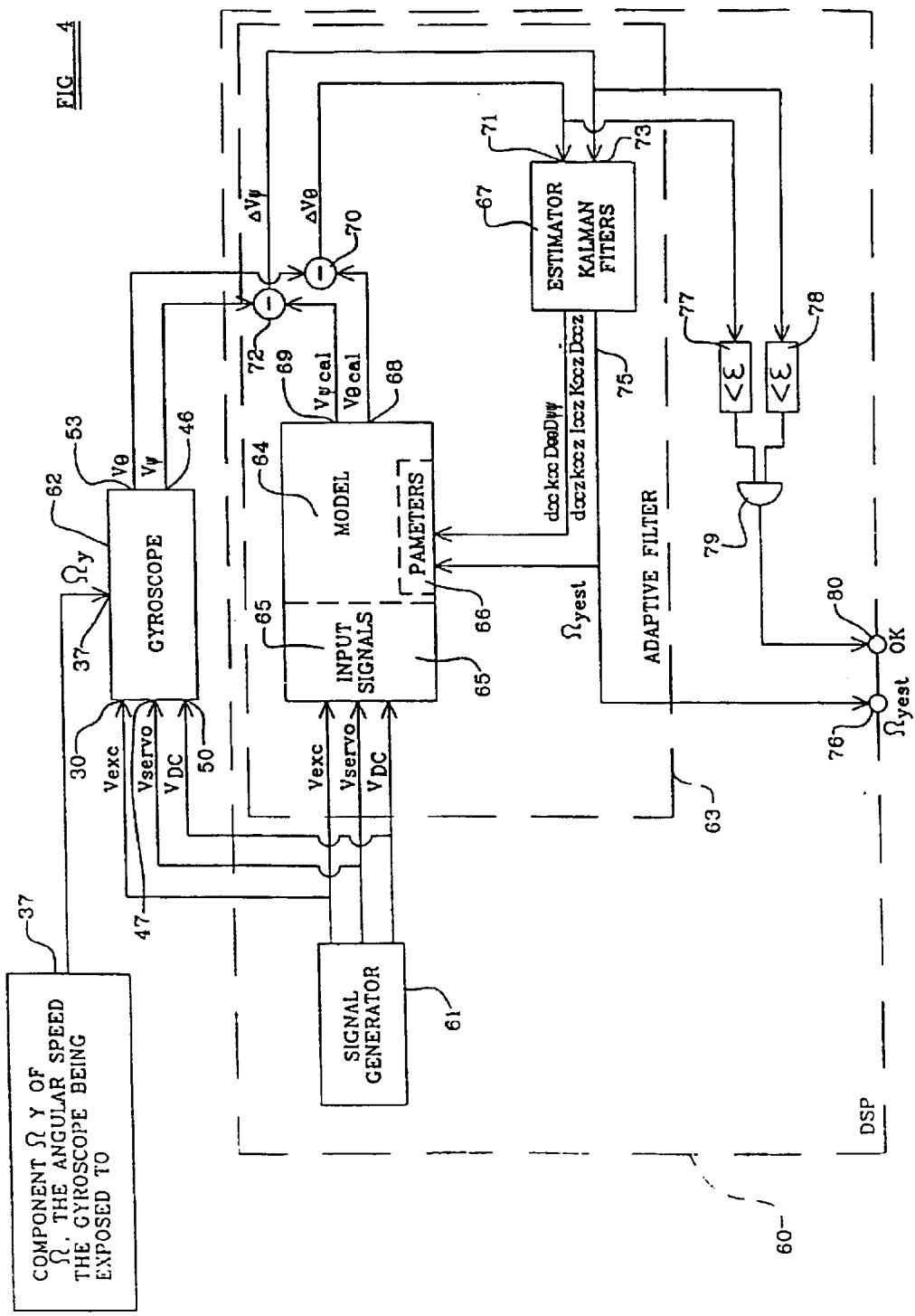

OFF-SET ELIMINATION SYSTEM FOR A VIBRATING GYROSCOPE

CROSS REFERENCE TO RELATED APPLICATION

This application claims the priority of British Application No. 0116812.9 filed Jul. 9, 2001, the disclosure of which is being incorporated herein by reference.

BACKGROUND OF THE INVENTION

The present invention relates to an off-set elimination system for a vibrating gyroscope, and more particularly relates to an off-set elimination system for use with micro-machined gyroscopes.

It has been proposed previously to provide various types of micro-machined gyroscopes. A gyroscope of this type is described in WO99/38016. In this specification a gyroscopic sensor is provided which is formed from a planar substrate, which is an etched silicon substrate. The substrate is etched to define a beam, the opposed ends of which are adapted to be fixed in position, the beam having a preferential bending direction which makes an acute angle with the plane of the planar substrate. The beam carries an inertia mass comprising two arms or plates which are interconnected by a connecting bar, the central part of the connecting bar being formed unitarily with part of the beam. The bar extends substantially at 90° to the beam, and the two arms or plates are on opposite sides of the beam. Capacitative plates are located adjacent areas of a conductive layer formed on the arms, and the capacitative plates are provided with potentials or an excitation voltage which cause the inertia mass to rotate about the axis of the connecting bar with a "see-saw" action which, because of the configuration of the beam, leads to a rotational oscillation of the inertia mass in the plane of the substrate. If the arrangement is then rotated about an axis coincident with the connecting bar, the inertia mass rotates about an axis coincident with the beam with an oscillating rotation. This is detected by further capacitative plates, on which a detection voltage appears, to determine the angular velocity of the rotation of the arrangement about the axis coincident with the beam. The angular velocity of the entire gyroscope about the axis coincident with the connecting bar can then be calculated.

Other micro-machined vibrating gyroscopes have also been proposed previously.

It has been proposed that such vibrating gyroscopes could be used as sensors in motor vehicles to sense accidents, and in particular to sense a roll-over situation. In such a case the sensing axis, in the following description defined as the "y" axis, should be aligned with the longitudinal axis or driving direction of the vehicle. However, it is envisaged that such gyroscopic sensors may also be utilised for measuring the orientation of the car about a vertical axis, which may be of particular use in connection with a navigation system. In such a case the measured angular velocity has to be measured extremely accurately, since angular velocity will be integrated to give a signal equal to the total angle of rotation, and a very small error of the angular velocity will, when integrated, gradually lead to a very big error of the total angle of rotation. In such a case it is very important to eliminate all possible errors.

It has been found that, due to production variations, a large number of undesired sources of error may be found in any typical micro-machined gyroscope which will cause offset errors for the gyroscope. Such errors may be relatively large, especially when compared with the desired resolution for the gyroscope.

For example the spring or spring forces provided effectively by the beam of a gyroscope of the type described above may not be symmetrical, due to a lack of symmetry in the beam caused during manufacture. The result of this can be asymmetrical spring forces which generate a torque that excites the detecting mode of the gyro, simply in response to the potentials which are intended to cause the inertia mass to rotate about the axis of the connecting bar.

The distance or position of the detection and excitation electrodes may be unsymmetrical and the mass or masses of the various arms may not be symmetrical. The excitation electrodes and the detection electrodes can each be misaligned. Furthermore the excitation voltage can, due to cross-talk, be at least partially coupled to the detection voltage.

SUMMARY OF THE INVENTION

The present invention seeks to provide an arrangement which can provide compensation for errors of the general type discussed above.

According to this invention there is provided a gyroscopic arrangement for measuring angular speed the arrangement comprising a gyroscope comprising at least one mass supported on support means such that the mass can vibrate in a first mode around a first axis and a second mode around a second axis which is inclined relative to the first axis, there being excitation means to excite vibrations in the first mode and detection means to generate an output comprising at least one detection signal representative of the vibrations in the second mode, the vibration of the first mode being coupled to the second mode when the gyroscope is exposed to an angular motion about a third axis inclined relative to both the first and second axes, the arrangement being such that the detection signal contains information about the angular speed about the third axis, wherein the excitation means are adapted to provide at least one electronic signal to the gyroscope, there being means to vary the or each said electronic signal, wherein, in order to obviate the effect of any errors in the gyroscope caused by undesired geometric properties of the gyroscope and/or undesired electric couplings, the arrangement further comprises a simulation model of the gyroscope, which is connected to receive the signal or signals supplied to the gyroscope by the excitation means, the model being adapted to provide an output equivalent to the output of the gyroscope, the output of the model being compared with the output of the gyroscope as the or each electronic signal is varied to provide a difference signal, the difference signal being provided to an estimator which is also part of the arrangement, the estimator being adapted to determine the presence of and the size of errors within the gyroscope and in response to that determination to adjust the model and to estimate a signal corresponding to the angular speed around the third axis, the estimator and model being adapted to perform an iterative process leading to a situation where the model substantially simulates the instantaneous operation of the system, so that the estimated value of angular speed as estimated by the estimator is substantially the same as the actual angular speed.

Preferably, the estimator comprises an adaptive filter.

Conveniently, the adaptive filter is at least one Kalman-filter.

Advantageously, a signal generator generates a plurality of said electronic signals which are fed to the system and to the model.

Preferably, means are provided to vary the frequency and/or magnitude of signals generated by the signal generator over a period of time.

Conveniently, the gyroscope and the model each produce an output representative of vibration of the mass about the first axis and vibration of the mass about the second axis, the measured output values from the gyroscope and the calculated output values being subtracted, the subtracted values being supplied to the estimator.

Preferably, the subtracted values are passed to discriminators and when the subtracted values are each less than a predetermined value an output signal is generated to indicate that the then estimated value of the said angular speed is substantially correct.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a plan view of a micro-machined gyroscope, illustrating schematically various potentials present on electrodes forming part of the gyroscope, FIG. 2 is a sectional view of the gyroscope of FIG. 1 taken on the line II—II, FIG. 4 is a block diagram of the embodiment of the invention.

DETAILED DESCRIPTION OF THE INVENTION

Figure 3:
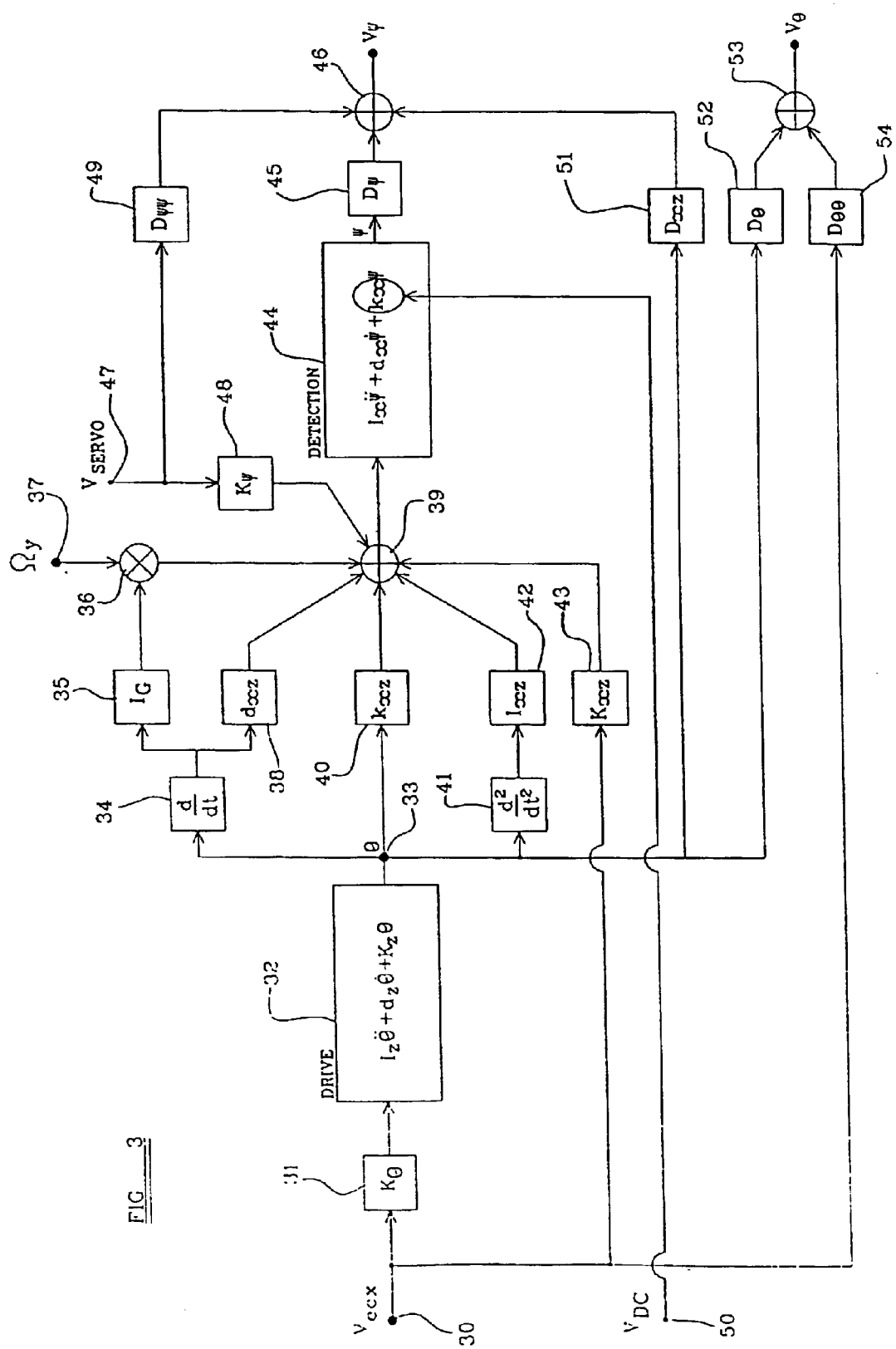
FIG. 3 is a block diagram illustrating schematically, by an explanatory model, the operation of the gyroscope of FIG. 1.

The present invention is based on an understanding that a physical gyroscope has a number of different "errors" or inconsistencies, and those errors can each be considered to be a specific function of one or more of the physical or electrical inputs to the gyro. Thus, by varying any one specific input to the physical gyroscope, which is an input associated with one or more of the errors, the output of the gyroscope will alter in a manner that is influenced by the relevant error or errors. Thus, by selectively modifying or altering the various inputs to the gyroscope, and by then analysing the resultant changes in the output, it is possible to define the various errors that are present within the gyroscope.

Consequently, the present invention proposes the use of a "model" or simulated gyroscope which is to be used in conjunction with a real gyroscope. By varying at least one of the input signals to the real gyroscope, and appropriately processing the resultant output signals from the real gyroscope, it will be possible to create a model or simulation of the real gyroscope, with that model or simulation incorporating all of the errors that are actually present in the real gyroscope. If the model is provided with an estimated value for the rotation that is to be measured by the real gyroscope, if, at any instant, for only one such estimated value, the output of the model or simulated gyroscope is the same as the output of the real gyroscope, for all variations of the input signals, then this estimated value for the rotation to be measured by the real gyroscope must be correct.

It is, of course, important that all of the input parameters of the real gyroscope system which influence any of the errors present in the real gyroscope system should be altered or modulated in a known way so that the effect of the errors can be determined from the output signal of the real gyroscope, to ensure that the model or simulated gyroscope includes all of the appropriate errors or inconsistencies. In the described embodiments of the invention this is achieved by providing the model or simulated gyroscope, which may be a computer model or computer simulation, with all of the input signals that are provided to the real gyroscope, and also with a simulated input signal representing the angular rotation to be measured by the real gyroscope. The outputs of the real gyroscope and the model are subtracted from each other, and the difference signal is provided to an estimator in the form of a number of Kalman filters, the output from the estimator being provided to the model or simulation of the real gyroscope to effect modifications to the model, and to estimate the angular velocity so that the difference signal between the output of the model and the output of the gyroscope is brought towards zero.

Referring initially to FIGS. 1 and 2 of the drawings, the principal parts of a micro-machined gyroscope are illustrated. The gyroscope comprises a body 1 which is micro-machined from a planar substrate, such as a silicon wafer. The body 1 defines a linear beam 2 of rectangular cross-section, the plane of the longer sides of the beam being substantially perpendicular to the plane of the substrate. Opposed ends, 3, 4 of the beam are adapted to be mounted securely in position.

The beam carries an inertia mass comprising two rectangular elements 5, 6 which are interconnected by a connecting bar 7, which is again of rectangular cross-section, the central part of the connecting bar being formed unitarily with the central part of the beam 2.

The elements 5, 6 are of the same size and are symmetrical about the beam 2, thus having aligned edges. At one end of the substrate one side edge of the element 5 is provided with an electrode 8 and the aligned side edge of the element 6 is provided with an electrode 9. The electrodes 8 and 9 may simply comprise areas of conducting material, such as metal, applied to the substrate.

Adjacent to but spaced slightly from the electrode 8 is an exciting electrode 10 and, in a corresponding position with regard to the electrode 9, there is a second exciting electrode 11. The electrodes 10 and 11 are connected to two posts of a terminal 13. The electrodes 8 and 9 are connected to a central post of the terminal 13.

Formed on the relatively large planar face of the element 5 is an electrode 14 which is shown as a rectangular electrode and a similar electrode 15 is provided on the face of the element 6. The electrodes are symmetrically located.

Located adjacent to but spaced from the electrode 14 is a sensor electrode 16 and, at a similar position with regard the electrode 15 there is a second sensor electrode 17. The sensor electrodes 16 and 17 are connected to two posts of a second terminal 18, a central post being connected to plates 14, 15.

It is to be appreciated that, in use of the gyroscope as shown with reference to FIGS. 1 and 2 an excitation voltage $V_{exc}$, which is an alternating voltage, is applied between the right and central posts of the terminal 13. A voltage minus the subscript $V_{exc}$ is applied between the left and central posts. A biasing DC voltage A is also applied between the right and central posts, as well as between the left and central posts of the terminals 13. Thus a voltage which is the DC voltage A, which is greater than or equal to the amplitude of $V_{exc}$, on which the alternating voltage is super-imposed, is applied between the plates 10 and 8, and between the plates 11 and 9. Thus a variable attracting force will act alternately between plate 10 and 8, and between plate 11 and 9. This causes the elements 5 and 6 constituting the inertia mass to rotate about an axis z, identified by the reference numeral 19 in FIG. 1. The axis z intersects the central part of the correcting bar 7 which is formed unitarily with the central part of the beam 2, and is perpendicular to the plane of the substrate 1. The excitation voltage typically has a frequency in the range of 2 to 30 kHz, and the inertia mass executes an angular oscillating motion through an angle θ. The oscillating motion is found to be 90° behind the phase of $V_{exc}$.

If the gyroscope is then exposed to a rotation about the y axis, (which is the axis that lies in the plane of the substrate and is coaxial with the connecting bar 7 that connects the two elements 5, 6 of the inertia mass), such as a rotation having an angular speed of $\Omega_y$, then, due to gyroscopic torque, the inertia mass begins to oscillate about the x axis, which is the axis in the plane of the substrate which is coincident with the beam 2. The oscillation about the x axis is an oscillation through the angle Ψ with a phase which is 90° behind θ. The oscillation through the angle Ψ about the x axis adjusts the distance between the respective electrodes 14 and 15 (connected to the middle electrode of terminal 18) provided on the elements 5, 6 of the inertia mass and the sensor electrodes 16 and 17, thus generating a voltage $V_Ψ$ on the electrodes 18. The voltage $V_Ψ$ is in phase with Ψ and thus 180° behind the phase, of the voltage $V_{exc}$.

It is envisaged that the excitation voltage $V_{exc}$ will be selected to be the natural resonance frequency of oscillation, about the axis z, of the inertia mass. Ideally the resonance frequency of the oscillation movement through the angle Ψ about the axis x will also be the same resonance frequency. This is difficult to achieve in practice, but the effective resonance frequency of the rotation about the x axis may be adjusted by applying a biasing DC voltage $V_{DC}$ to two posts of the terminal 18 (i.e. $V_{DC}$ on both of the sensor electrodes 16 and 17). This voltage has the same effect as altering the spring forces provided by the beam 2.

In use of the gyroscope the angle θ could be measured by determining a potential $V_θ$ present at two posts of the terminal 13, representing the capacitance between the plates 10 and 8, and between the plates 11 and 9 respectively. $V_θ$, is in phase with θ and thus 90° behind $V_{exc}$.

In some cases it may be desirable to apply a further voltage $V_{servo}$ to the terminal 18 to apply a reverse coupling (negative feedback) on the gyroscope so that the instrumentation amplifiers which would typically be used with the gyroscope, do not become saturated. For the same reason that the DC voltage A was added to $V_{exc}$, as described above, a DC voltage B is added to $V_{servo}$.

A chip associated with the gyroscope includes multiplex circuits connected to the terminals 13 and 18, so that the different input and output signals can be separated.

It is to be appreciated that in the described gyroscope an inertia mass, constituted by the two plates 5 and 6 is mounted on a support means so that the mass can vibrate in a first mode around a first axis, namely the z axis and also rotate about a second axis, namely the x axis which is inclined, in this case by 90°, relative to the first axis. The described electrodes constitute excitation means to excite vibrations in the first mode and detection means to generate a detection signal representative of the vibrations in the second mode. As has been mentioned the vibration of the first mode is coupled to the second mode when the described gyroscope is exposed to an angular rotation about a third axis, the y axis, which is also inclined relative to both the first and second axes, the third axis being inclined to each of the first and second axes by 90° in the described embodiment. The arrangement is such that the detection signal contains information about the angular speed of the motion about the third axis.

At least theoretically the output signals $V_θ$ and the $V_Ψ$ can be analysed to determine the angular speed $\Omega_y$ of the angular rotation about the y axis. It is to be noted that the rotational vibration about the x axis (Ψ) of the inertia mass is a function of the gyroscopic torque:

$$\Omega_y \cdot \theta' \cdot I_G$$

where θ' is the angular speed of rotation about the z axis 19 (which is the angular speed primarily generated by the $V_{exc}$ as applied to the electrodes 10 and 11) and where $I_G$ is a geometrical scaling factor determined by the geometry of the gyroscope.

In particular:

$$I_G = I_x + I_z - I_y$$

where $I_x$, $I_z$ and $I_y$ are the moments of inertia around the respective axes. (Ψ is 90° behind θ as Ψ is proportional to θ').

Referring now to FIG. 3 of the accompanying drawings, it is to be understood that due to production errors, a number of undesired sources of error may appear. These sources of error lead to incorrect signals being present as the output signals $V_Ψ$ and $V_θ$. Some of the errors have a mechanical original and some are caused by direct electronic couplings. The situation is such that offset errors exist for the gyroscope, and the offset errors may be rather large, especially when compared with the desired resolution for the gyroscope. Some errors are mainly constant with time, some vary slowly and some vary more quickly. Some errors vary with temperature.

Referring now to FIG. 3, which is an explanatory diagram of the gyroscope of FIGS. 1 and 2, the voltage $V_{exc}$ is shown applied to an effective input 30 of the described gyroscope. The voltage is converted to a torque, the torque $T_θ$ being related to the excitation voltage $V_{exc}$ by the equation:

$$K_θ = T_θ / V_{exc.}$$

This is shown diagrammatically at box 31. The torque is applied as a drive to drive the inertia mass constituted by the elements 5 and 6 about the z axis 19 as shown schematically at box 32. The drive effects a movement of the inertia mass which can be considered to have three components. The movement can be considered as being represented by the differential equation for the oscillation around the z axis.

The first component of the movement is related to the moment of inertia $I_z$ about the z axis and the second derivative of θ with respect to time.

The second component of the movement can be considered to be related to the damping factor $d_z$ and the first derivative of θ with respect to time.

The third component of the movement can be considered to be related to the spring force caused by the deflection of the beam 2 as a result of the rotation of the inertia mass about the axis z, namely the spring constant $k_z$, and the instantaneous angle θ of displacement of the inertia mass.

At any instant there is a displacement θ, from the initial position, of the inertia mass, as shown at node 33. The first derivative of the instantaneous angle θ with respect to time, as shown with respect to the box 34, is transferred, by a geometric scaling factor $I_G$, shown as box 35, which is dependent upon the geometry $\Omega_y$ of the gyro, to a point 36 where it is effectively multiplied to the angular velocity, shown applied to the node 37, which is the angular velocity to be sensed. Also the first derivative with respect to time provides an indication of any asymmetric damping forces $d_{xz}$, as shown by box 38, due to the structure of the sensor. The result of these asymmetric damping forces is applied to a node 39 which represents the gyroscopic coupling between the rotation about the z axis excited by the voltage $V_{exc}$ and the rotation about the x axis as a consequence of the rotation $\Omega_y$ about the y axis.

At any instantaneous angle θ a further error may be generated, as exemplified by the box 40, which error is passed directly to the node 39, this error, $k_{xz}$ being due to asymmetric spring forces which may be caused, most probably, by uneven manufacture of the beam 2. The size of the error is proportional to the size of the angle θ. Any variation in cross-section along the length of the beam 2 may provide such a asymmetric spring force. The asymmetric spring force may be experienced as the elements 5 and 6 of the inertia mass rotate about the z axis and/or may be experienced as the elements 5 and 6 of the inertia mass rotate about the x axis.

The second derivative with respect to time of the instantaneous angle θ which is present at node 33, as indicated by box 41, can determine the magnitude of an error $I_{xz}$, as indicated by box 42, that error being caused by asymmetric mass present in the sensor. This error may be caused, therefore, if the elements 5 and 6 are of differing mass. This error is applied directly to the node 39.

A further error that is applied directly to the node 39, which is related directly to $V_{exc}$ is indicated by box 43, this error $K_{xz}$, being an error generated by asymmetric excitation. Such asymmetric excitation can arise if the initial spacing between the electrodes 8 and 10 is not precisely the same as the initial spacing between the electrodes 9 and 11, if the electrodes 8, 10, 9 and 11 are differing sizes or if the electrodes 10 and 11 are not each accurately aligned with the electrodes 8 and 9. Effectively asymmetric excitation arises if $V_{exc}$, acting on the excitation electrodes, directly effects not only θ but also Ψ (with $\Omega_y=0$).

All inputs of node 39 are added and the output is connected to a box 44 representing the differential equation for the second motion, which corresponds to the rotation of the inertia mass about the axis x, i.e. the instantaneous angle Ψ. The energy that is coupled, from the node 39, to the detection 44 results in a movement through an angle Ψ which includes various components. (Ideally Ψ should only be dependent on the gyroscopic torque, but in reality Ψ is also dependent on a number of other parameters of which some are time-dependent).

A first component is related to the moment of inertia $I_x$ about the x axis and the second derivative of Ψ with respect to time.

The second component is related to the damping factor $d_x$ and the first derivative of Ψ with respect to time. The third component relates to the spring force of the beam 2 about the x axis (the spring constant $k_x$) and the instantaneous value of the angle of rotation from the initial position Ψ.

The output of the detection 44 is effectively converted, by converter 45 to a voltage by a function $D_\Psi$ according to the equation $$D_\Psi = V_\Psi / \Psi.$$

The output of the box 45 is connected to an output node 46.

$V_{servo}$ is applied to a node 47. The $V_{servo}$ generates a torque, as indicated by box 48, as represented by $K_\Psi$. $K_\Psi$ is defined by the following equation:

$$K_\Psi = T_\Psi / V_{servo}.$$

The output of box 48 is applied to node 39, where it is included in the sum of the inputs to the node. $V_{servo}$, as applied to node 47 also provides a direct cross-talk $D_{\Psi\Psi}$ as indicated by box 49, to the output node 46.

At this stage it is to be mentioned that $V_{DC}$, as applied from an input 50 to the electrode 16 and 17 has an electronic effect upon $k_x$, the spring constant of the beam 2 as sensed by rotation of the inertia element in the x axis. Thus $V_{DC}$ is applied to connection 44.

The instantaneous angle θ, as present on node 33, due to asymmetric detection $D_{xz}$, as indicated by box 51, has a direct influence upon the signal of node 46. Asymmetric detection may be caused by non-alignment or different sizes of the electrode pairs 14, 16 and 15, 17 so that the capacitors constituted by the electrode pairs 14, 16 and 15, 17 have different capacitative couplings.

The instantaneous value of θ is converted to an output voltage as shown at box 52 with a function $D_\theta$ which is defined by the equation:

$$D_\theta = V_\theta / \theta.$$

The output of box 52 is fed to a node 53.

There is direct cross-talk between the $V_{exc}$ as applied to node 30 and the node 53, the cross-talk having the function $D_{\theta\theta}$ as identified by box 54. The magnitude of the cross-talk does depend upon the precise design of the gyro. The output of box 54 is shown applied to node 53.

A nominal output signal $V_\Psi$ is present on the node 46 and the nominal output signal $V_\theta$ is present on the node 53. However, as can be appreciated, the output signals are tainted or polluted by a large number of potential error signals from the various possible sources of error described above.

Input 30 and output 53 corresponds to terminals 13 of FIG. 1.

Input 47 and 50 and output 46 corresponds to terminals 18 of FIG. 1.

To be able to identify and eliminate at least some of the errors described above, a simulation model of the gyro, based on the explanatory model of FIG. 3, could be used. A "simulation model" is, in contrast to an "explanatory model", active and "calculates" outputs in response to variable inputs. The simulation model is supplied with the same electrical input signals as supplied to the real gyroscope, that is to say with the same signals $V_{exc}$, $V_{servo}$ and $V_{DC}$. The frequency, phase and/or magnitude of at least one of the signals supplied to the gyro and to the simulation model may be varied with time. Each of the signals that is related to an error in the real gyro may be varied sequentially, or two or more signals may be varied simultaneously.

The simulation model has a number of parameters which are related to electrical properties of the actual gyroscope, and a number of parameters related to the geometrical properties of the actual gyroscope. The model is also provided for an input for the estimated angular velocity which is to be determined by the real gyroscope.

Approximately correct parameter values can be determined by effecting different measurements and tests on the real gyroscope, before the real gyroscope is actually used, and, at least theoretically, could be calculated from the measured $V_\Psi$. However, a real gyroscope may have a behaviour which various in an unpredictable way, especially in connection with variations with some of the parameters. It is for this reason that it is most desirable to use the described simulation model in parallel with the real gyroscope during use of the gyroscope.

As mentioned above, the model calculates outputs which are intended to be equivalent to the outputs of the real gyroscope in response to the various inputs provided to the model. The output from the real gyroscope is compared with the output from the simulation model, and in the described embodiment the two outputs are subtracted. Of course, if the simulation model is totally "correct", the difference between the two outputs will be zero. However, the extent of the difference between the two outputs will give an indication as to how closely the model is matching the performance of the real gyroscope.

It is to be appreciated that, at any instant, if the amplitude and frequency of the input signals are fixed, there would be many combinations of parameters of a model that would give a zero output from each of the subtractors but, in all probability, only one of these combination of parameters would include or lead to the correct value of $\Omega_y$. It is by exposing both the real gyroscope and the simulation model to a number of different values through at least one of the inputs that the number of combinations of model parameters that will give the desired zero outputs will be reduced. By increasing the number of input values that are altered, one moves finally towards one combination of parameters that will give the desired zero outputs, and that combination would include the correct value for $\Omega_y$.

Whilst, for some parameters which do not change with time, pre-measured values could be used, the estimator that has been described is of particular value in estimating the values for parameters which change with time, as long as the outputs from the subtractors in the described embodiment differ from zero for any combination of input values. As long as the outputs from the subtractors actually differ from zero for any combination of input values, the estimator will provide new adjusted parameter values in accordance with the iterative procedures that have been described, which should bring the outputs from the subtractors towards zero. If the simulation model can be brought to a state that the outputs from the subtractors are substantially zero for all combinations of input values, then the input to the simulation model must be, to a very close approximation, the same as the rotational velocity experienced by the real gyroscope.

The output of the gyro $V_\Psi$, $V_\theta$ may be monitored, with that monitoring of the gyro, especially during the variation of the input signals, being carried out to determine the various sources of error of the gyro and the magnitude of those various sources of error. For example, if an error is related to the magnitude of a voltage, such as the error $K_{xz}$ of box 43 which is related to $V_{exc}$, if the magnitude of $V_{exc}$ is altered, then that error will be altered, enabling the error to be observed and the size of the error to be determined. The sources of error, and the magnitude of the sources of error, (the parameters of the model) when estimated, can be injected into the simulation model. A notional parameter, equivalent to $\Omega_y$ can be estimated and injected into the simulation model. An iterative procedure is followed until the output signals calculated by the simulation model are within a predetermined margin of error of the output signals generated by the system. In such a situation the estimated $\Omega_y$ being injected into the model must be, to a very close approximation, the same as the actual $\Omega_y$ being sensed by the gyro.

Thus, in other words, by varying the external inputs to the real gyro and also to a simulation model of the real gyro it is possible to determine and measure the actual errors of the real gyro and to modify the parameters of the previously prepared simulation model of the real gyro so that the simulation model of the real gyro operates in substantially the same way as the real gyro, complete with errors. By causing the simulation model to operate so that the output of the simulation model is substantially the same as the output of the real gyro, the parameter values being provided to the simulation model are representative of the errors and $\Omega_y$ being sensed by the real gyro. Thus the angular speed about the y axis, $\Omega_y$, that is estimated and entered to the simulation model, must be substantially the same as the actual $\Omega_y$ being sensed by the gyro.

Whilst in the described embodiment subtractors are used to subtract the signals from the real gyroscope and the simulation model of the gyroscope, in an alternative embodiment a divider circuit could be used to divide one output signal by the other output signal, thus producing a quotient. Any other appropriate form of comparator could also be utilised.

Each variable that is adjusted may be adjusted with time, or may be subjected to a stochastic variation, like noise. The frequency of any such variation may correspond with a certain predetermined band width.

In order to minimise the processing capacity required, the rate of up-dating a particular parameter value should correspond to how fast the corresponding parameter of the real gyroscope changes. As $\Omega_y$ would be expected to change quickly, this parameter should be up-dated frequently. Other parameters change more slowly, and thus the requirement to check or re-calibrate these parameters is less pressing, and this procedure can be carried out at less frequent intervals.

Referring now to FIG. 4 of the accompanying drawing, showing a gyroscopic arrangement according to this invention, a digital signal processor 60 includes circuitry that constitutes a signal generator 61. The signal generator 61 is shown providing inputs to a gyroscope 62 which is the same as the gyroscope shown in FIGS. 1 to 2. The various input nodes for $V_{exc}$, $V_{servo}$ and $V_{DC}$ are shown. The input $\Omega_y$ is also given the same reference numeral as in FIG. 3 and the outputs for $V_\theta$ and $V_\Psi$ are also given the same references.

The signal generator 61 is shown as forming part of a digital signal processor 60. The digital signal processor 60 incorporates an adaptive filter arrangement 63 which in turn include a simulation model 64 of the gyroscope 62. The model 64 is provided with a sector 65 adapted to receive the external input signals as supplied by the signal generator 61 to the gyroscope 62, that is to say the signals $V_{exc}$, $V_{servo}$ and $V_{DC}$. The model is also provided with a sector 66 adapted to receive signals from an estimator 67 representative of the various "errors", as discussed above, that can be present in the gyro, and also an estimated value of $\Omega_y$.

The model has outputs 68 for calculated $V_\theta$ and 69 for calculated $V_\Psi$. The calculated value for $V_\theta$, as presently on output 68 is supplied to a subtractor 70 which also receives a signal $V_\theta$ as present on the output 53, from the gyro. The two signals are subtracted to produce a difference signal $\Delta V_\theta$ which is fed to a node 71 which constitutes one input of the estimator 67. Similarly the calculated value for $V_\Psi$ as present on output 69 is supplied to a subtractor 72 where it is subtracted from the signal $V_\Psi$ as present on output 46 from the gyro to produce a difference signal $\Delta V_\Psi$ which is fed to a node 73 which constitutes a second input to the estimator.

The estimator 67 comprises a number of Kalman-filters. The Kalman-filters may comprise one or a plurality of parallel Kalman-filters, which may continuously follow the unbalanced parameters as well as the estimated signal $\Omega_y$. The estimator 67 provides a first output 74 which provides information to the sector 66 of the model 64 indicative of the presence of and the value of errors present in the gyroscope 62, such as the errors numerated above. The estimator 67 provides a second output 75 which is an estimated value of the signal $\Omega_y$ being input into the gyroscope 62. This output 75 is also fed directly to the parameters section 66 of the model 64, but is also supplied to an output terminal 76 of the digital signal processor 60.

The output signals from the two subtractors 70 and 72, as present on the nodes 71 and 73 are each connected, through a respective discriminator 77, 78 to an AND-gate 79 the output of which is connected to an output terminal 80 of the digital signal processor. The discriminators 77 and 78 are each adapted to pass a signal when the input signal to the discriminator is below a predetermined threshold. Thus, when the calculated value for $V_\theta$ present on the output 68 of the model 64 is substantially the same, within a limit determined by the discriminator 77, as the output signal $V_\theta$ present on output 53 of the gyroscope 62, the AND-gate 79 is enabled and when also the calculated signal $V_\Psi$ as present on output 69 of the model is substantially the same as the output signal $V_\Psi$ present on output 46 of the gyro, again within a limit as determined by the discriminator 78, the AND-gate 79 is opened. When the AND-gate 79 is opened so that a signal is present on the output 80, the whole arrangement as shown in FIG. 4 is such that the gyro and the model are operating in synchronism, meaning that $\Omega_y$ estimated, as present on output 76 is, with a very small degree of possible error, substantially identical to $\Omega_y$ as input to the gyro.

The digital signal processor 60 may incorporate a temperature sensor, to assist in sensing and parameters that may change with a changing temperature.

In use of the described arrangement, the variables will initially be varied, possibly under the initial control of a pre-programmed processor unit, to enable the model to be brought "into synchronism" with the real gyroscope. The parameters will then continue to be varied, but parameters likely to change slowly will only be varied slowly and other parameters, such as $\Omega_y$, which may change more rapidly, are charged more frequently, to ensure that the model continues to run "in synchronism" with the real gyro.

In the present Specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A gyroscopic arrangement for measuring angular speed, the arrangement comprising:
   a gyroscope comprising:
      at least one mass supported on a support such that the mass can vibrate in a first mode around a first axis and a second mode around a second axis which is inclined relative to the first axis;
      an exciter adapted to excite vibrations in the first mode; and
      a detector adapted to generate an output comprising:
         at least one detection signal representative of the vibrations in the second mode, the vibration of the first mode being coupled to the second mode when said gyroscope is exposed to an angular motion about a third axis inclined relative to both the first and second axes, said at least one detection signal comprises information about the angular speed about the third axis, wherein said exciter is adapted to provide at least one electronic signal to said gyroscope,
            a varying device adapted to vary one or more of said at least one electronic signal;
   a simulation model of said gyroscope to obviate the effect of any errors in said gyroscope caused by at least one of undesired geometric properties of said gyroscope or undesired electric couplings, said simulation model, coupled to receive the one or more of said at least one electronic signal supplied to said gyroscope by said exciter, said simulation model being adapted to provide an output equivalent to the output of said gyroscope, the output of said simulation model being compared with the output of said gyroscope as one or more of said at least one electronic signal is varied to provide a difference signal; and
   an estimator being provided said difference signal, said estimator adapted to determine the presence of and size of errors within said gyroscope and in response to that determination to adjust said simulation model and to estimate a signal value corresponding to the angular speed about the third axis,
   wherein said estimator and said simulation model are adapted to perform an iterative process wherein said simulation model substantially simulates the instantaneous operation of said gyroscope so that the estimated signal value of the angular speed as estimated by said estimator is substantially the same as the actual angular speed about the third axis.

2. The arrangement according to claim 1 wherein said estimator comprises an adaptive filter.

3. The arrangement according to claim 2 wherein said adaptive filter is at least one Kalman-filter.

4. The arrangement according to claim 1 wherein a signal generator generates a plurality of said electronic signals which are fed to said gyroscope and to said simulation model.

5. The arrangement according to claim 1 wherein at least one of frequency or magnitude of signals generated by a signal generator are varied over a period of time.

6. The arrangement according to claim 5 wherein said gyroscope and said simulation model each produce an output representative of vibration of the mass about the first axis and vibration of the mass about the second axis, the measured output values from said gyroscope and the calculated output values being subtracted, the subtracted values being supplied to said estimator.

7. The arrangement according to claim 6 wherein the subtracted values are passed to discriminators and when the subtracted values are each less than a predetermined value an output signal is generated to indicate that the then estimated value of the said angular speed is substantially correct.

8. A gyroscopic arrangement for measuring angular speed, the arrangement comprising:
a gyroscope comprising:
means for supporting at least one mass such that the mass can vibrate in a first mode around a first axis and a second mode around a second axis, said second axis is inclined relative to said first axis;
excitation means for exciting vibrations in the first mode; and
detection means for generating an output comprising:
at least one detection signal representative of the vibrations in the second mode, the vibration of the first mode being coupled to the second mode when said gyroscope is exposed to an angular motion about a third axis inclined relative to both the first and second axes, said at least one detection signal comprises information about angular speed about the third axis, wherein said excitation means provide at least one electronic signal to said gyroscope,
variation means for varying one or more of said at least one electronic signal;
simulation means for simulating said gyroscope to obviate the effect of any errors in said gyroscope caused by at least one of undesired geometric properties of said gyroscope or undesired electric couplings; said simulation means coupled to receive the one or more of said at least one electronic signal supplied to said gyroscope by said excitation means, said simulation means further providing an output equivalent to the output of said gyroscope, the output of said simulation means being compared with the output of said gyroscope as one or more of said at least one electronic signal is varied to provide a difference signal; and
estimation means for estimating the presence and size of errors within said gyroscope, said estimation means being provided said difference signal and in response to the estimation adjusting said simulation means and estimating a signal value corresponding to the angular speed about the third axis,
wherein said estimation means and said simulation means are further performing an iterative process wherein said simulation means substantially simulates the instantaneous operation of said gyroscope, so that the estimated signal value of the angular speed as estimated by said estimation means is substantially the same as the actual angular speed about the third axis.

9. The arrangement according to claim 8 wherein said estimation means comprises means for adaptive filtering.

10. The arrangement according to claim 8 wherein said variation means is capable of varying at least one of frequency or magnitude of the one or more of said at least one electronic signal over a period of time.

11. The arrangement according to claim 10 wherein said gyroscope and said simulation means each produce an output representative of vibration of the mass about the first axis and vibration of the mass about the second axis,
means for measuring output values from said gyroscope and said simulation means, and means for subtracting said output values, wherein the subtracted output values are supplied to said estimation means.

12. The arrangement according to claim 11 wherein the subtracted output values are passed to a discrimination means indicating whether or not the estimated value of said angular speed is substantially correct.

13. A method for measuring angular speed of a gyroscope, the method comprising:
exciting vibrations in the gyroscope using at least one electronic signal;
exposing the gyroscope to an angular motion about a third axis inclined relative to both a first and second axis;
transmitting an output from the gyroscope representative of said vibrations;
creating a simulation model of said gyroscope, said simulation model receiving said at least one electronic signal to excite vibrations in the gyroscope, wherein said simulation model provides an output equivalent to the output of said gyroscope;
comparing the output of said gyroscope with the output of said simulation model by varying one or more of said at least one electronic signal;
generating a difference signal from the comparison;
estimating errors in the gyroscope from said difference signal;
adjusting said simulation model based on said estimation of errors and estimating an angular speed about the third axis; and
iterating said estimation of errors and adjusting said simulation model to substantially simulate instantaneous operation of the gyroscope.

14. The method according to claim 13, wherein said adjusting said simulation model to simulate instantaneous operation of the gyroscope further comprises: adjusting the simulation model so that the estimated value of the angular speed is substantially the same as the actual angular speed.

15. The method according to claim 13, wherein said estimating errors further comprises: estimating errors caused by at least one of undesired geometric properties or undesired electronic couplings.

16. The method according to claim 13, wherein said estimating errors comprises adaptive filtering.

17. The method according to claim 16, wherein said adaptive filtering comprises Kalman-filtering.

18. The method according to claim 13, wherein said varying said at least one electronic signal comprises varying at least one of frequency or magnitude of one or more of said at least one electronic signals over a period of time.

19. The method according to claim 13, further comprising:
providing an output representative of a vibration about the first axis and of a vibration about the second axis from both the gyroscope and said simulation model and subtracting the output representative of the vibrations about the first and second axes from the gyroscope and said simulation model, wherein the subtracted outputs are supplied to estimate the presence of errors.

20. The method according to claim 19, further comprising:
discriminating between the subtracted values, and indicating whether or not the angular speed is substantially correct.

* * * * *